United States Patent [19]

Jones

[11] Patent Number: 4,619,065
[45] Date of Patent: Oct. 28, 1986

[54] COMBINATION FISHNET AND FISHHOOK RETRIEVER

[76] Inventor: Stephen S. Jones, 1761 Carlos Dr., Las Vegas, Nev. 89123

[21] Appl. No.: 663,399

[22] Filed: Oct. 22, 1984

[51] Int. Cl.⁴ .............................................. A01K 77/00
[52] U.S. Cl. .......................................... 43/11; 43/12; 43/17.2
[58] Field of Search .......................... 43/7, 11, 12, 17.2

[56] References Cited

U.S. PATENT DOCUMENTS

| | | | |
|---|---|---|---|
| 2,768,462 | 10/1956 | Younce | 43/17.2 |
| 2,800,737 | 7/1957 | Crossan | 43/12 |
| 3,030,725 | 4/1962 | Sandul | 43/12 |
| 3,077,693 | 2/1963 | Wallin | 43/11 |
| 3,548,531 | 12/1970 | Holden | 43/11 X |
| 4,086,718 | 5/1978 | Swanson et al. | 43/17.2 |
| 4,138,790 | 2/1979 | Schmucker | 43/12 |
| 4,263,864 | 4/1981 | Carter et al. | 43/12 X |
| 4,508,467 | 4/1985 | Choffin | 43/17.2 |

FOREIGN PATENT DOCUMENTS 251462  5/1926  United Kingdom .................... 43/11

Primary Examiner—Nicholas P. Godici
Assistant Examiner—C. Cuda
Attorney, Agent, or Firm—Edward J. Quirk

[57] ABSTRACT

A combination fishing net and snagged-hook retriever has a tubular handle with a telescopically extendable member carried within. The extension member is axially removable from the net handle when retrieval of a snagged hook is necessary. A preferred hook retriever is a split-ring device having a pair of bent arms which substantially encircle the line proximate to the hook, enabling multi-directional forces to be applied to the hook resulting in its disengagement.

8 Claims, 6 Drawing Figures

COMBINATION FISHNET AND FISHHOOK RETRIEVER

BACKGROUND OF THE INVENTION

This invention relates to a combination device useful for fishermen. More particularly, the invention relates to an apparatus which is a combination of a fishhook retriever and a fishing net.

In enjoying the sport of fishing, fishermen must frequently carry substantial quantities of equipment over great distances. On any given trip, they frequently have the opportunity to use various types of fishing poles, tackle and protective clothing, and, on extended trips, camping equipment. Many fishermen also seek relatively remote fishing locations, which may not be accessible to conventional vehicles and must be reached on foot. Even if an off-road vehicle can be used, the availability of space-saving equipment is highly desirable.

One of the most frequent problems encountered by fishermen, particularly in shallow lakes and streams, is the necessity to retrieve hooks and lures which have become entangled in rocks or underwater vegetation. If a hook cannot be disengaged by jerking or alternately pulling and releasing on the line, it is frequently necessary to cut or break the line. While several devices have been known in the past for disengaging snagged hooks, it is generally cumbersome for a fisherman to carry such a device along with him for occasional use, particularly when standing in a boat, and therefore these devices have not achieved popularity. However, the problem of losing snagged fishhooks is a persistent, annoying, and expensive one.

It is an object of the invention to provide a snagged hook retriever which is completely enclosed within a long-handled fishing net, and which can be removed for use only when needed. It is a further object of the invention to provide a combination fishhook retriever and fishing net which can be extended for use and compacted for storage or transportation. It is yet another object of the invention to provide a fishing net having a hook retriever telescopically stored in its handle which can be extended for use only when needed.

The invention consists generally of a fishing net having an elongate hollow tubular handle which encloses a concentric but smaller, telescopically extendable tube having hook retrieving means on the end opposite the net. The hook retrieving means is a modification of the disengager disclosed in Younce, U.S. Pat. No. 2,768,462. The modifications to the Younce device permit the retriever to be stored entirely within the handle of the net of the invention. Accordingly, the aforementioned objects of the invention are accomplished by means of the combination device of the invention, a preferred embodiment of which is disclosed herein.

SUMMARY OF THE INVENTION

A combination fishing net and snagged hook retriever comprises a net mounted on a frame which is attached to one end of a long tubular handle. The handle is mounted by means of a mounting bracket having a centrally located aperture through which the handle is slidably mounted. A second elongate handle is mounted concentrically within the net handle, and extends telescopically when needed for use in retrieving a snagged fishhook. Hook-retrieving means is located on the opposite end of the extendable handle from the net. A series of biased stop means permit the hook retriever to be extended to varying selected lengths.

BRIEF DESCRIPTION OF THE DRAWINGS

The invention is best understood with reference to the drawings, in which.

DESCRIPTION OF A PREFERRED EMBODIMENT

Figure 1:
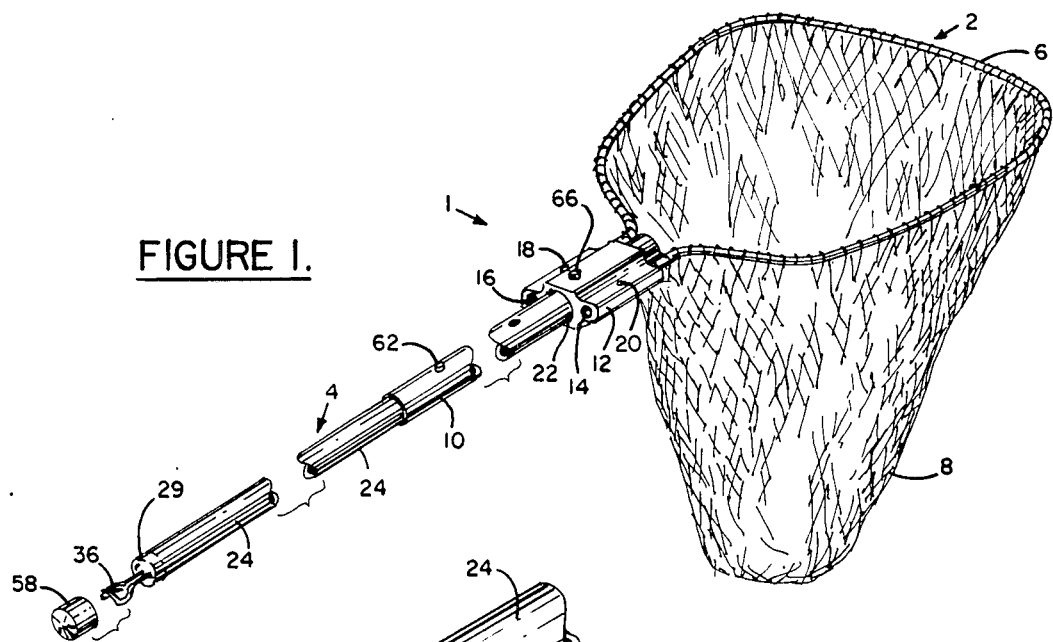
FIG. 1 is a perspective view of the combination fishnet/hook retriever of the invention, with the hook retriever shown in extended position.

Referring first to FIG. 1, the combination net and fishhook retriever 1 of the invention has a net portion 2 located at one end of the device and a hook-retriever portion 4 located at the opposite end. A conventional woven net 8 is supported on a generally enclosed tubular frame 6 fabricated from a single length of ⅜" diameter plain aluminum welded tubing which has been bent into a loop of the appropriate shape. The net handle 10 is an elongate tubular cylinder fabricated from 1⅛" diameter aluminum. The handle and net are connected by means of a mounting bracket 12 having two length-wise bores 14 and 16 which extend parallel to a center bore 22 adapted to slidably engage the handle. The mounting bracket is fixedly attached to the net frame by extending the two end portions of the tubular frame into the bores on the mounting bracket and by securing the frame by set screws 18 and 20 which extend transversely through the mounting bracket and into corresponding holes (not shown) in the frame.

Figure 2:
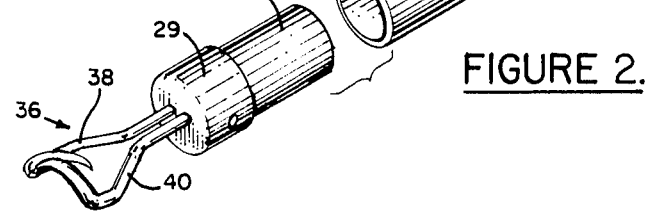
FIG. 2 is a perspective view of the hook retriever portion of the device.
Figure 3:
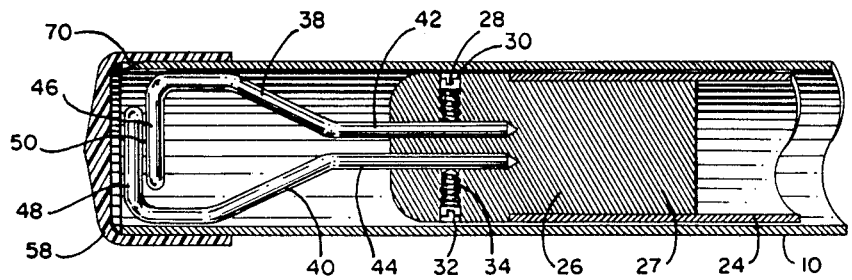
FIG. 3 is a side elevational view of the hook retriever portion of the device of the invention, with the hook retriever in retracted position in the net handle.

A second elongate handle member 24 is telescopically mounted inside of net handle 10, and carries fishhook retrieving means 36 on the end of the handle opposite the end of the device upon which the net is mounted. The retriever has an extended position for use in hook retrieval and a retracted position for storage, as further described later. The hook retriever is mounted in the end of the inner tubular shaft by means of a mounting plug 26, seen best in FIGS. 2 and 3. The plug consists of a solid cylindrical portion 27 which extends into the interior of the tubular shaft and frictionally engages the shaft, and a socket portion 29 which holds the retriever. The retriever 36 is comprised of two arm members fabricated from ⅛" solid rods which are bent into congruent hook portions as shown in FIGS. 2 and 3. In general, the retriever is constructed similarly to the retriever described in Younce, U.S. Pat. No. 2,768,462, with an important difference being that the largest width of the retriever arms is less than the interior diameter of the net handle, thereby permitting the entire retriever to retract completely within the net handle. Arms 38 and 40 have two leg or pin portions 42 and 44, respectively which slidably engage the sockets which extend longitudinally into the plug. The pins are retained in the sockets by set screws 30 and 34 which are mounted in transverse threaded channels 28 and 32.

Figure 6:
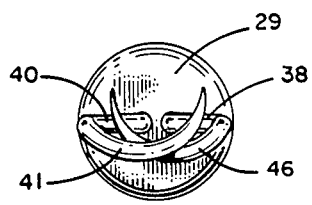
FIG. 6 is an end view of the retriever portion of the device.

The design of the hook retriever 36 is best seen in FIGS. 2, 3, and 6. FIG. 6 shows an end view of the retriever, FIG. 3 shows a side view, and FIG. 2 a perspective view. The respective arms 38 and 40 of the retriever extend parallel to each other for a short distance away from the socket, and then extend outwardly in a Y-shape, subsequently again attaining a straight parallel form. The end portions 46 and 48 are generally located in parallel planes which are perpendicular to the net handle, and are separated by a small space or slot 50. As seen in FIG. 6, the end portions of the retriever are pointed. The space between the end portions of the retriever members provides a slot through which the fishline may be inserted, thereby guiding the retriever along the line down to the snagged hook. The function of the design is to provide a "split ring" which substantially surrounds the line near the snagged hook. The slot is designed such that movement of the ring in multiple directions to effect disengagement will not permit the line to slip through the slot. Of substantial importance to the invention is that the exterior diameter of the retrieving means does not exceed the exterior diameter of handle extension 24, thus permitting the entire unit to be retracted into the handle.

Figure 5:
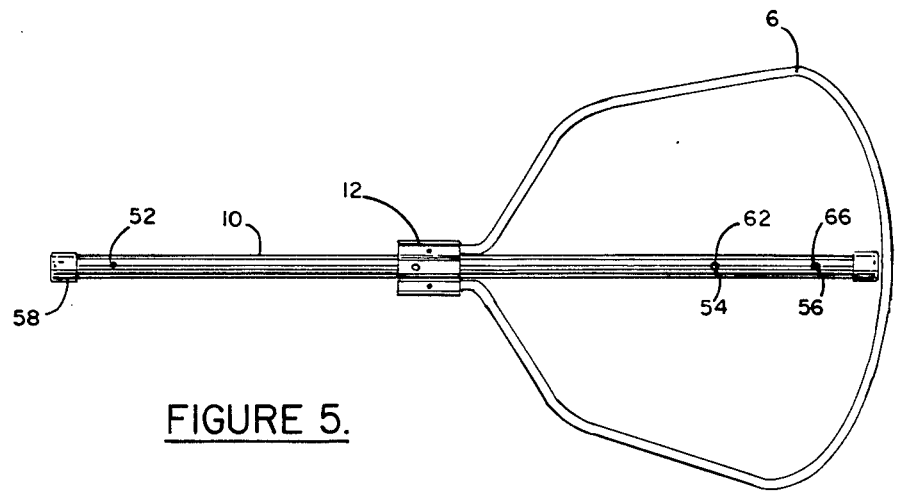
FIG. 5 is a top plan view showing the net handle in retracted, or stored, position.

As seen in FIG. 5, the exterior net handle has three circular radial bores 52, 54, and 56 located along its length. Bore 52 is located approximately 3" inward from the retriever end of the handle, and bore 56 is located approximately the same distance in from the net end of the handle. A third bore 54 is located approximately 8" from the upper end of the handle. Spring-operated lugs 62 and 66 register with the bores to form stop means to secure the net frame onto the shaft and to lock the telescopic shaft in the various desired positions. Lug 62 is mounted in the inner shaft extension about 3" from its upper end (i.e., end closest to the net); lug 66 is mounted in the outer shaft near its upper end and serves to lock the mounting bracket 12 to the handle. When the handle is in the fully extended position, as shown in FIG. 1, lug 62 extends through bore 52, and the length of the handle is extended by at least 75%.

Figure 4:
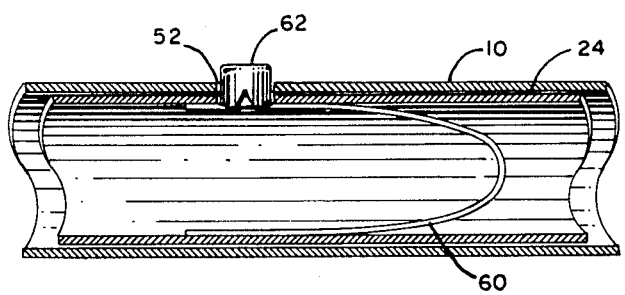
FIG. 4 is a partial section view of the handle showing the spring-operated stop means.

Operation of the radially biased lugs is best seen in FIG. 4. Lug 62 is a cylindrical projection mounted on one end of a U-shaped leaf spring which is frictionally held within inner shaft 24. Leaf spring 60 biases the lug into the stop position, but can be easily depressed with a thumb to permit the inner shaft to slide within the net handle. When the lug 62 aligns with bore 52, it is urged through the bore by the spring, thereby precluding further relative movement of the inner and outer tubular members. A notch 70 (see FIG. 2) is cut into the edge of the net handle to indicate that the inner shaft is rotationally aligned with the handle so as to permit the lug to extend in locking position through the handle bores. The notch aligns with the external edge of arm 46 of the retriever.

A second thumb lug 66 is similarly mounted at an upper end of the net handle, thereby permitting the handle 10 to slidably extend through mounting bracket 12. This enables the net handle to be extended through the bracket to the position shown in FIG. 5, which is very convenient for storage or transportation in a vehicle. For example, in the handle-retracted position, the device of the invention can easily be carried in the trunk of a car.

When it is desired to use the combination device of the invention, the net handle is moved from the retracted position shown in FIG. 5 to the extended position shown in FIG. 1, with lug 66 extending through bore 56 at the upper end of the handle and through the corresponding bore in the mounting bracket 12. If a fisherman desires to use the fish-hook retriever, the cap 58 is removed from the end of the net handle, and lug 62, which in the retriever-retracted position is extending through bore 54 in the net handle, is depressed. In this condition, the retriever may be withdrawn axially to an extended position, with the lug 62 extending through bore 52 at the lower end of the net handle. In this condition, the retriever is mounted rigidly on the end of an extended handle, and is used by inserting the fishing line within the space between the two retriever members such that the line lies in the ring formed by the retriever arms. The retriever is then guided down the fishing line toward the hook until it engages the obstruction. At this point, the pole is rotated around its axis to bring the line into rotational contact with the retriever members, deflecting the line from its normal condition. With the retriever in close engagement with the obstruction, the pole can be rotated back and forth, subjecting the hook to rapid multi-directional forces. Generally, these movements will release the hook, enabling its removal.

While the invention has been described with respect to a specific design of a hook retriever, in actuality other designs may conveniently be substituted for the preferred design disclosed herein. The invention should not be limited with respect to the specific embodiment disclosed, and many variations and embellishments will be apparent to one skilled in the art within the spirit and scope of the invention. Accordingly, the invention should be considered limited only by the following claims.

I claim:

1. A combination fishing net and snagged-hook retriever comprising
    a fishing net mounted on a frame,
    an elongated hollow tubular handle operatively connected to the frame,
    an elongated handle extension member telescopically mounted within the handle, being movable between a retracted position fully enclosed within the handle and an extended position in which only a portion of the extension member remains within the handle,
    hook-retrieving means mounted on an end portion of the extension member and having a maximum diameter not exceeding the diameter of the extension member such that when the extension member is retracted, the hook-retrieving means is entirely enclosed within the tubular handle, and stop means for releasably locking the extension member in a retracted or extended position,
    the hook-retrieving means comprising a ring member formed by a pair of arms, and a slot in the ring member permitting access of a fishing line therethrough.

2. The combination of claim 1 wherein the stop means is a radially based lug mounted in the extension member.

3. The combination of claim 2 wherein the biased lug is adapted to register with a bore in the tubular handle.

4. The combination of claim 2 wherein the biased lug is adapted to register with a plurality of bores in the tubular handle.

5. The combination of claim 2 wherein the tubular handle also has a plurality of spaced, longitudinally aligned bores, and the biased lug is adapted to selectively register with said aligned bores and to thereby lock the extension member into fixed position relative to the handle, said bores and lug being positioned so as to enable the extension member to increase the length of the handle by at least 75%.

6. The combination of claim 1 also comprising a net mounting bracket slidably mounted on the handle, and second stop means for releasably locking the mounting bracket in place proximate to an end of the handle.

7. The combination of claim 6 wherein the second stop means comprises a second biased lug mounted within the handle.

8. A combination fishing net and snagged-hook retriever comprising
   a fishing net mounted on a frame,
   an elongated tubular handle,
   a net mounting bracket slidably mounted on the handle,
   locking means for releasably fixing the mounting bracket to the handle,
   an extension member movable between a retracted position entirely enclosed within the handle and an extended position,
   second locking means for releasably fixing the extension member in the extended position, and
   hook retrieving means attached to an end of the extension member, and having a maximum diameter not exceeding the diameter of the extension member such that when the extension member is retracted, the hook-retrieving means is entirely enclosed within the tubular handle, the hook-retrieving means comprising a ring member formed by a pair of arms, and a slot in the ring member permitting access of a fishing line therethrough.

* * * * *